United States Patent
Chen et al.

(10) Patent No.: US 12,363,703 B2
(45) Date of Patent: Jul. 15, 2025

(54) COLLISION HANDLING FOR SOUNDING REFERENCE SIGNAL GUARD PERIOD AND A PHYSICAL UPLINK SHARED CHANNEL TRANSMISSION

(71) Applicant: QUALCOMM Incorporated, San Diego, CA (US)

(72) Inventors: Bo Chen, Beijing (CN); Mingkai Nan, Beijing (CN); Hao Xu, Beijing (CN); Sony Akkarakaran, Poway, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 312 days.

(21) Appl. No.: 17/906,791

(22) PCT Filed: Mar. 24, 2021

(86) PCT No.: PCT/CN2021/082639
§ 371 (c)(1),
(2) Date: Sep. 20, 2022

(87) PCT Pub. No.: WO2021/227670
PCT Pub. Date: Nov. 18, 2021

(65) Prior Publication Data
US 2023/0144253 A1    May 11, 2023

(30) Foreign Application Priority Data

May 13, 2020   (WO) ................ PCT/CN2020/089929

(51) Int. Cl.
*H04W 4/00*      (2018.01)
*H04L 5/00*      (2006.01)
(Continued)

(52) U.S. Cl.
CPC ....... *H04W 72/1268* (2013.01); *H04L 5/0051* (2013.01); *H04L 27/2605* (2013.01)

(58) Field of Classification Search
None
See application file for complete search history.

(56) References Cited

U.S. PATENT DOCUMENTS 10,264,567 B2   4/2019  Noh et al.
10,588,141 B2   3/2020  Rico Alvarino et al.
(Continued)

FOREIGN PATENT DOCUMENTS

WO    WO-2011057211 A1 *  5/2011  ............... H01Q 1/00
WO    WO-2012044337 A1 *  4/2012  ........... H04B 1/7143
(Continued)

OTHER PUBLICATIONS

Ericsson: "Correction of SRS Bandwidth", R1-2000237, 3GPP TSG-RAN WG1 Meeting #100-e, Online, Feb. 24-Mar. 6, 2020, Mar. 6, 2020, 5 Pages.
(Continued)

*Primary Examiner* — Zewdu A Beyen
(74) *Attorney, Agent, or Firm* — Harrity & Harrity LLP

(57) ABSTRACT

Various aspects of the present disclosure generally relate to wireless communication. In some aspects, a user equipment (UE) may identify a collision between a physical uplink shared channel (PUSCH) transmission and a guard period of a sounding reference signal (SRS) transmission, wherein the SRS transmission includes a first SRS transmission and a second SRS transmission, the second SRS transmission uses a first set of one or more antenna ports of the UE, and the PUSCH transmission uses a second set of one or more antenna ports of the UE; and perform an action to mitigate the collision based at least in part on identifying the collision. Numerous other aspects are provided.

30 Claims, 8 Drawing Sheets

(51) Int. Cl.
*H04L 27/26* (2006.01)
*H04W 72/1268* (2023.01)

(56) References Cited

U.S. PATENT DOCUMENTS

| | | | |
|---|---|---|---|
| 2014/0016475 A1 | 1/2014 | Zhou et al. | |
| 2015/0326373 A1* | 11/2015 | Ryu | H04L 5/0092 370/329 |
| 2017/0265181 A1* | 9/2017 | Patel | H04W 72/0446 |
| 2019/0289513 A1 | 9/2019 | Jeon et al. | |
| 2019/0349066 A1 | 11/2019 | Yang et al. | |
| 2019/0380123 A1 | 12/2019 | Yang et al. | |
| 2020/0295895 A1 | 9/2020 | Wu et al. | |

FOREIGN PATENT DOCUMENTS

| | | | |
|---|---|---|---|
| WO | 2017223196 A1 | 12/2017 | |
| WO | WO-2018005481 A1 | 1/2018 | |
| WO | 2019164309 A1 | 8/2019 | |

OTHER PUBLICATIONS

International Search Report and Written Opinion—PCT/CN2020/089929—ISA/EPO—Feb. 18, 2021.
International Search Report and Written Opinion—PCT/CN2021/082639—ISA/EPO—Jun. 18, 2021.
Qualcomm Incorporated: "Additional SRS Symbols", 3GPP Draft, 3GPP TSG-RAN WG1 #98bis, R1-1910731, Chongqing, China, Oct. 14-20, 2019, Oct. 20, 2019 (Oct. 20, 2019), 7 pages, section 2-7, the whole document.
Qualcomm Incorporated: "Additional SRS Symbols", R1-1912689, 3GPP TSG-RAN WG1 #99, Reno, USA, Nov. 18-22, 2019, Nov. 22, 2019, pp. 1-6.
Samsung: "Discussion on Additional SRS Symbols," 3GPP TSG RAN WG1 #98bis, R1-1910450, Chongqing, China, Oct. 14-20, 2019, (Apr. 10, 2019), section 2 and 3, 4 pages.
Supplementary European Search Report—EP21804323—Search Authority—The Hague—May 15, 2024.

* cited by examiner

COLLISION HANDLING FOR SOUNDING REFERENCE SIGNAL GUARD PERIOD AND A PHYSICAL UPLINK SHARED CHANNEL TRANSMISSION

CROSS-REFERENCE TO RELATED APPLICATIONS

This Patent Application is the 371 National Phase of PCT Application No. PCT/CN2021/082639, filed Mar. 24, 2021, entitled "COLLISION HANDLING FOR SOUNDING REFERENCE SIGNAL GUARD PERIOD AND A PHYSICAL UPLINK SHARED CHANNEL TRANSMISSION," which claims priority to Patent Cooperation Treaty (PCT) Patent Application No. PCT/CN2020/089929, filed on May 13, 2020, entitled "COLLISION HANDLING FOR SOUNDING REFERENCE SIGNAL GUARD PERIOD AND PUSCH TRANSMISSION," and assigned to the assignee hereof. The disclosure of the prior Applications are considered part of and are incorporated by reference into this Patent Application.

FIELD OF THE DISCLOSURE

Aspects of the present disclosure generally relate to wireless communication and to techniques and apparatuses for collision handling for a collision between a sounding reference signal (SRS) guard period and a physical uplink shared channel (PUSCH) transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
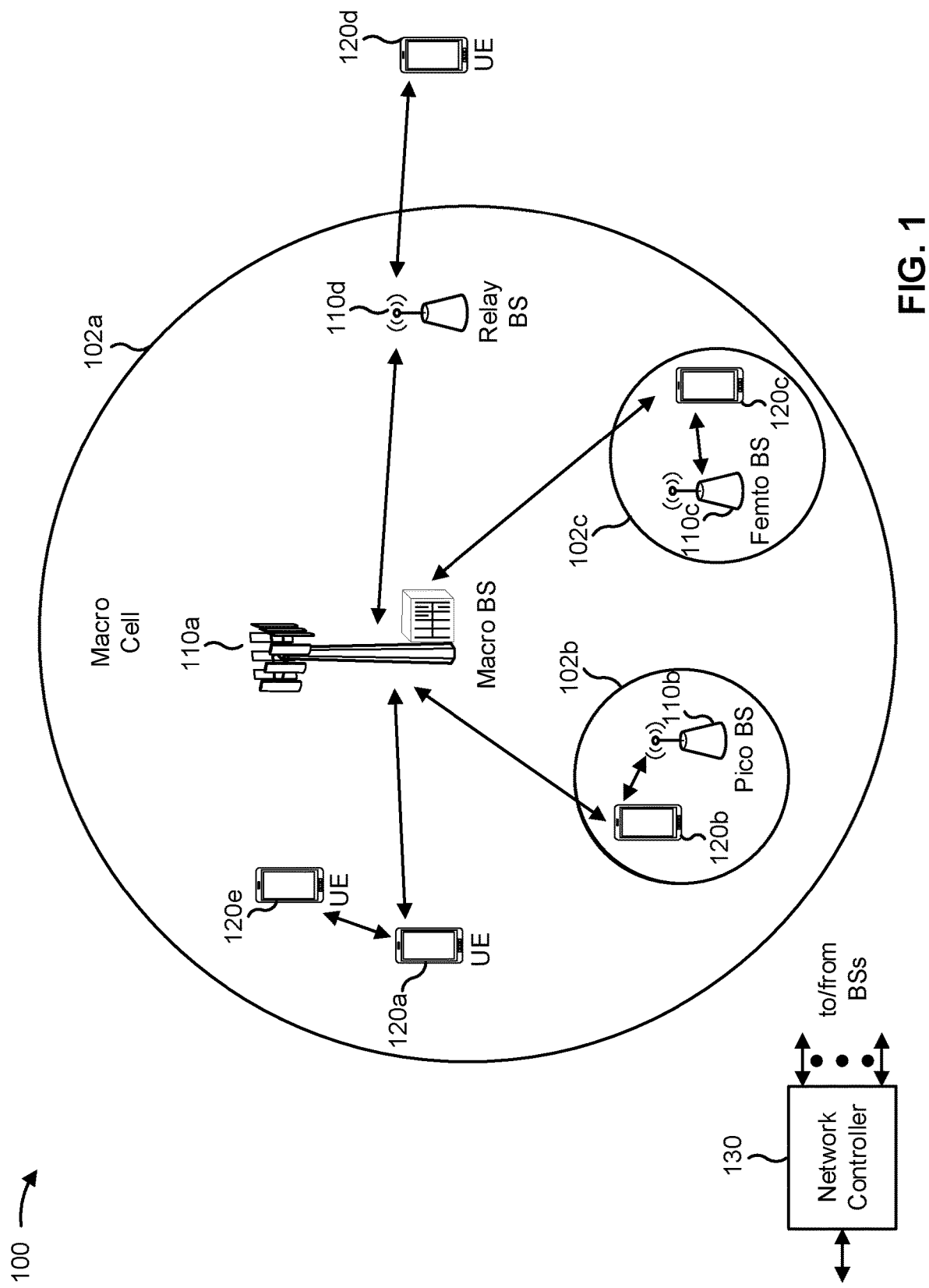
FIG. 1 is a diagram illustrating an example of a wireless network, in accordance with the present disclosure.

In some aspects, a method of wireless communication, performed by a user equipment (UE), may include identifying a collision between a physical uplink shared channel (PUSCH) transmission and a guard period of a sounding reference signal (SRS) transmission, wherein the SRS transmission includes a first SRS transmission and a second SRS transmission, the second SRS transmission uses a first set of one or more antenna ports of the UE, and the PUSCH transmission uses a second set of one or more antenna ports of the UE; and performing an action to mitigate the collision based at least in part on identifying the collision.

In some aspects, a method of wireless communication, performed by a base station, may include identifying a collision between a PUSCH transmission and a guard period of an SRS transmission, wherein the SRS transmission includes a first SRS transmission and a second SRS transmission, the second SRS transmission uses a first set of one or more antenna ports of a UE, and the PUSCH transmission uses a second set of one or more antenna ports of the UE; determining an action, to be performed by the UE, to mitigate the collision based at least in part on identifying the collision; and selectively receiving the PUSCH transmission or the SRS transmission based at least in part on determining the action.

In some aspects, a UE for wireless communication may include a memory and one or more processors coupled to the memory. The memory and the one or more processors may be configured to identify a collision between a PUSCH transmission and a guard period of an SRS transmission, wherein the SRS transmission includes a first SRS transmission and a second SRS transmission, the second SRS transmission uses a first set of one or more antenna ports of the UE, and the PUSCH transmission uses a second set of one or more antenna ports of the UE; and perform an action to mitigate the collision based at least in part on identifying the collision.

In some aspects, a base station for wireless communication may include a memory and one or more processors coupled to the memory. The memory and the one or more processors may be configured to identify a collision between a PUSCH transmission and a guard period of an SRS transmission, wherein the SRS transmission includes a first SRS transmission and a second SRS transmission, the second SRS transmission uses a first set of one or more antenna ports of a UE, and the PUSCH transmission uses a second set of one or more antenna ports of the UE; determine an action, to be performed by the UE, to mitigate the collision based at least in part on identifying the collision; and selectively receive the PUSCH transmission or the SRS transmission based at least in part on determining the action.

In some aspects, a non-transitory computer-readable medium may store one or more instructions for wireless communication. The one or more instructions, when executed by one or more processors of a UE, may cause the one or more processors to identify a collision between a PUSCH transmission and a guard period of an SRS transmission, wherein the SRS transmission includes a first SRS transmission and a second SRS transmission, the second SRS transmission uses a first set of one or more antenna ports of the UE, and the PUSCH transmission uses a second set of one or more antenna ports of the UE; and perform an action to mitigate the collision based at least in part on identifying the collision.

In some aspects, a non-transitory computer-readable medium may store one or more instructions for wireless communication. The one or more instructions, when executed by one or more processors of a base station, may cause the one or more processors to identify a collision between a PUSCH transmission and a guard period of an SRS transmission, wherein the SRS transmission includes a first SRS transmission and a second SRS transmission, the second SRS transmission uses a first set of one or more antenna ports of a UE, and the PUSCH transmission uses a second set of one or more antenna ports of the UE; determine an action, to be performed by the UE, to mitigate the collision based at least in part on identifying the collision; and selectively receive the PUSCH transmission or the SRS transmission based at least in part on determining the action.

In some aspects, an apparatus for wireless communication may include means for identifying a collision between a PUSCH transmission and a guard period of an SRS transmission, wherein the SRS transmission includes a first SRS transmission and a second SRS transmission, the second SRS transmission uses a first set of one or more antenna ports of the apparatus, and the PUSCH transmission uses a second set of one or more antenna ports of the apparatus; and means for performing an action to mitigate the collision based at least in part on identifying the collision.

In some aspects, an apparatus for wireless communication may include means for identifying a collision between a PUSCH transmission and a guard period of an SRS transmission, wherein the SRS transmission includes a first SRS transmission and a second SRS transmission, the second SRS transmission uses a first set of one or more antenna ports of a UE, and the PUSCH transmission uses a second set of one or more antenna ports of the UE; means for determining an action, to be performed by the UE, to mitigate the collision based at least in part on identifying the collision; and means for selectively receiving the PUSCH transmission or the SRS transmission based at least in part on determining the action.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
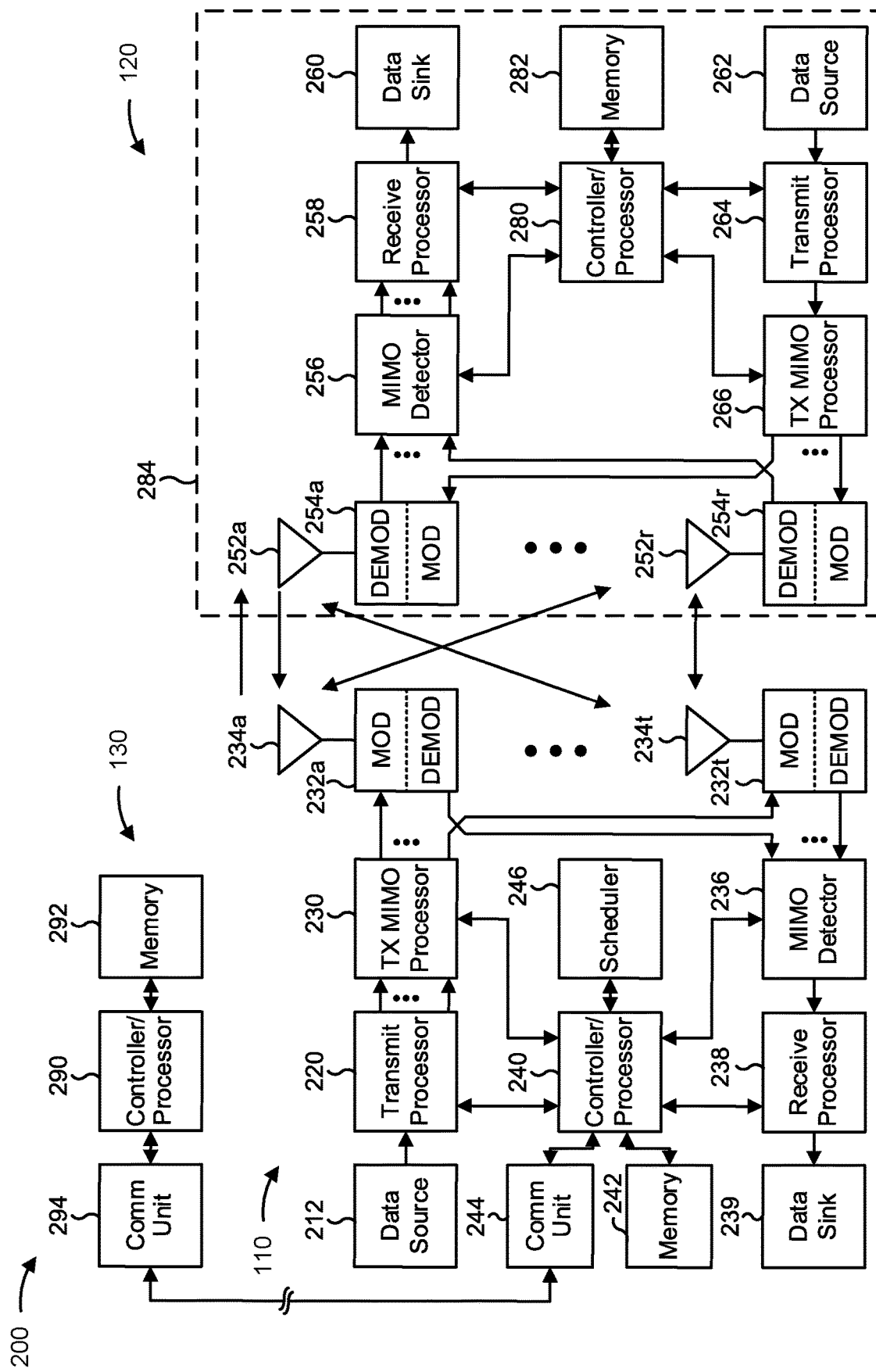
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-8).

Controller/processor 240 of base station 110, controller/processor 280 of UE 120, and/or any other component(s) of FIG. 2 may perform one or more techniques associated with collision handling for a collision between a sounding reference signal (SRS) guard period and a physical uplink shared channel (PUSCH) transmission, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for identifying a collision between a PUSCH transmission and a guard period of an SRS transmission, wherein the SRS transmission includes a first SRS transmission and a second SRS transmission, the second SRS transmission uses a first set of one or more antenna ports of the UE, and the PUSCH transmission uses a second set of one or more antenna ports of the UE, means for performing an action to mitigate the collision based at least in part on identifying the collision, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for identifying a collision between a PUSCH transmission and a guard period of an SRS transmission, wherein the SRS transmission includes a first SRS transmission and a second SRS transmission, the second SRS transmission uses a first set of one or more antenna ports of a UE, and the PUSCH transmission uses a second set of one or more antenna ports of the UE, means for determining an action, to be performed by the UE, to mitigate the collision based at least in part on identifying the collision, means for selectively receiving the PUSCH transmission or the SRS transmission based at least in part on determining the action, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
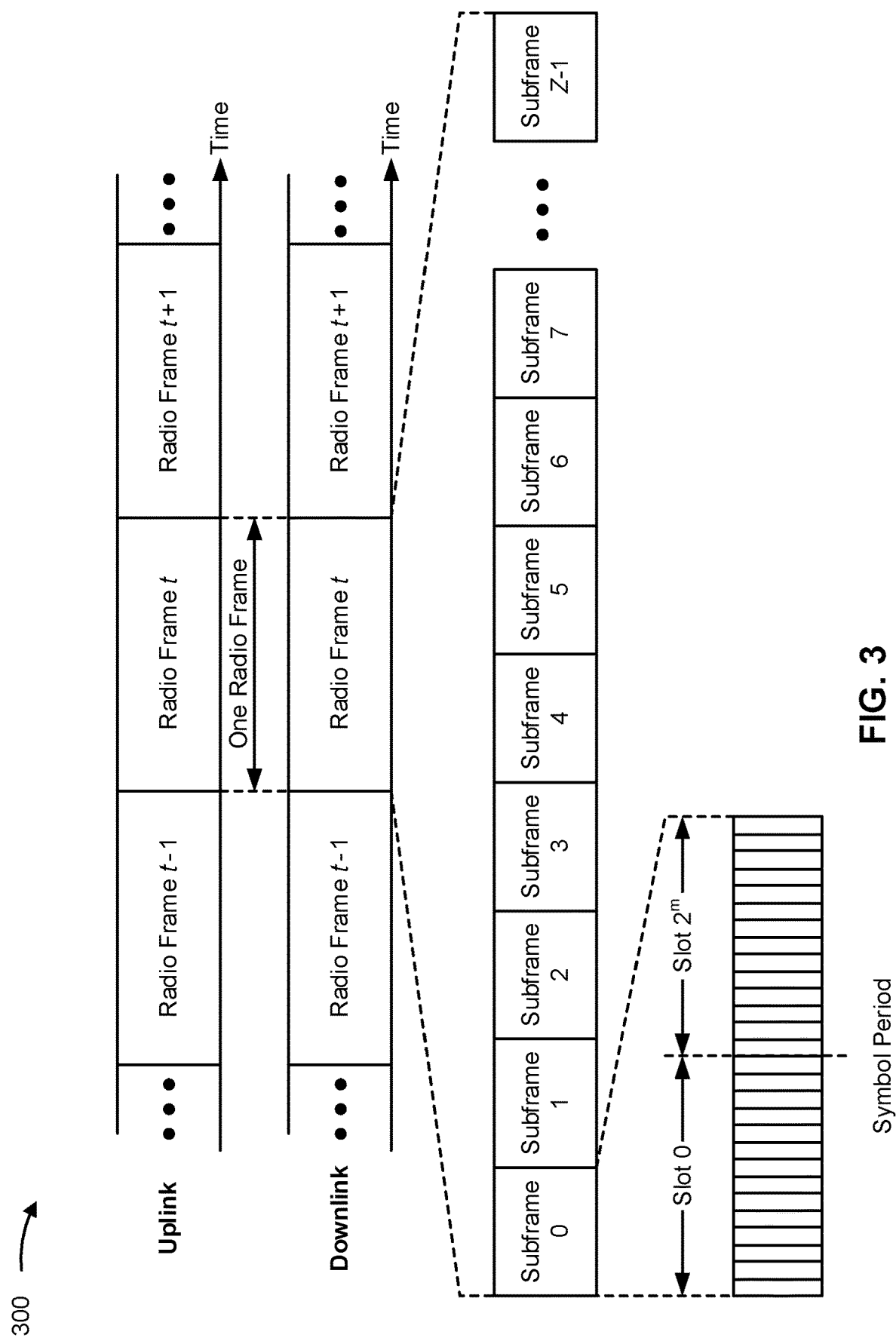
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as LTE, and/or NR, among other examples. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2 m slots per subframe are shown in FIG. 3, where m is an index of a numerology used for a transmission, such as 0, 1, 2, 3, and/or 4, among other examples). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, mini-slot based, and/or symbol-based, among other examples.

In some aspects, a radio frame may include one or more downlink slots (e.g., slots in which downlink communications may be scheduled), one or more uplink slots (e.g., slots in which uplink communications may be scheduled), and/or one or more special slots (e.g., slots in which downlink communications or uplink communications may be scheduled).

As indicated above, FIG. 3 is provided as an example. Other examples may differ from what is described with respect to FIG. 3.

Figure 4:
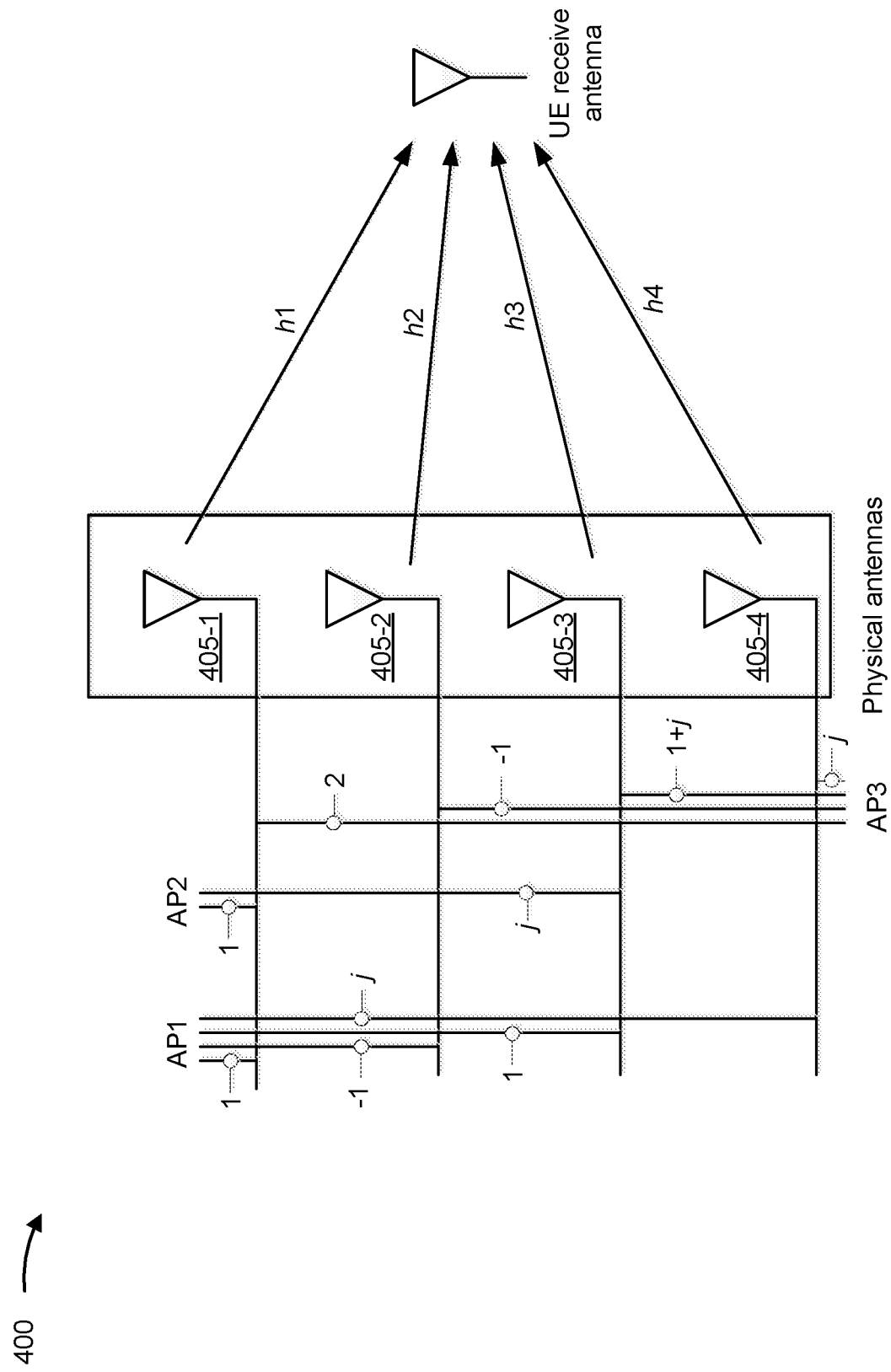
FIG. 4 is a diagram illustrating an example of antenna ports, in accordance with the present disclosure.

FIG. 4 is a diagram illustrating an example 400 of antenna ports, in accordance with the present disclosure.

As shown in FIG. 4, a first physical antenna 405-1 may transmit information via a first channel h1, a second physical antenna 405-2 may transmit information via a second channel h2, a third physical antenna 405-3 may transmit information via a third channel h3, and a fourth physical antenna 405-4 may transmit information via a fourth channel h4. Such information may be conveyed via a logical antenna port, which may represent some combination of the physical antennas and/or channels. In some cases, a UE 120 may not have knowledge of the channels associated with the physical antennas and may only operate based on knowledge of the channels associated with antenna ports, as defined below.

An antenna port may be defined such that a channel, over which a symbol on the antenna port is conveyed, can be inferred from a channel over which another symbol on the same antenna port is conveyed. In example 400, a channel associated with antenna port 1 (AP1) is represented as h1−h2+h3+j*h4, where channel coefficients (e.g., 1, −1, 1, and j, in this case) represent weighting factors (e.g., indicating phase and/or gain) applied to each channel. Such weighting factors may be applied to the channels to improve signal power and/or signal quality at one or more receivers. Applying such weighting factors to channel transmissions may be referred to as precoding, and "precoder" may refer to a specific set of weighting factors applied to a set of channels.

Similarly, a channel associated with antenna port 2 (AP2) is represented as h1+j*h3, and a channel associated with antenna port 3 (AP3) is represented as 2*h1−h2+(1+j)*h3+j*h4. In this case, antenna port 3 can be represented as the sum of antenna port 1 and antenna port 2 (e.g., AP3=AP1+AP2) because the sum of the expression representing antenna port 1 (h1−h2+h3+j*h4) and the expression representing antenna port 2 (h1+j*h3) equals the expression representing antenna port 3 (2*h1−h2+(1+j)*h3+j*h4). It can also be said that antenna port 3 is related to antenna ports 1 and 2 [AP1, AP2] via the precoder [1,1] because 1 times the expression representing antenna port 1 plus 1 times the expression representing antenna port 2 equals the expression representing antenna port 3.

As indicated above, FIG. 4 is provided merely as an example. Other examples may differ from what is described with regard to FIG. 4.

In a wireless network, a UE may be configured to perform antenna switching when performing one or more uplink transmissions. For example, in a sounding reference signal (SRS) configuration, a UE may be configured to transmit one or more SRS transmissions using different sets of one or more antenna ports. When performing antenna switching, a UE may perform one or more RF switches associated with connecting an antenna port to a physical antenna module. In some cases, an SRS transmission associated with antenna switching may be associated with a guard period. The guard period may be a quantity of symbols associated with an amount of time required by the UE to perform the one or more RF switches. The UE may be configured to not transmit any signals during the guard period to allow for the UE to perform the one or more RF switches.

In some cases, a base station may schedule or configure a physical uplink shared channel (PUSCH) transmission in an uplink slot following a slot in which an SRS transmission is configured. The SRS transmission may be configured in a last set one or more of symbols of the slot. However, the SRS transmission and the PUSCH transmission may be different sets of one or more antenna ports for transmitting (e.g., the UE may need to perform antenna switching between transmitting the SRS transmission and transmitting the PUSCH transmission). As a result, the SRS transmission may be associated with a guard period that extends into the uplink slot containing the PUSCH transmission. This may be referred to as a collision between the SRS guard period and the PUSCH transmission. Because the UE may be configured to not transmit any signals during the guard period, one or more symbols associated with the PUSCH transmission may be dropped. This may cause the UE to consume network resources (e.g., time resources, frequency resources, spatial resources, resource elements, and/or the like) associated with an increase in retransmissions for the UE, and/or may cause delays in the uplink transmissions, among other examples.

Some techniques and apparatuses described herein enable the UE to perform collision handling for a collision between an SRS guard period and a PUSCH transmission. For example, the UE may be enabled to identify the collision and perform an action (e.g., not transmit the SRS transmission or the PUSCH transmission) based at least in part on identifying the collision and applying one or more priority rules. As a result, the UE may ensure that uplink communications are not destroyed or dropped based at least in part on the collision. This may conserve network resources that would have otherwise been used to transmit retransmissions of dropped uplink communications, may reduce delays in uplink transmissions, and/or the like.

Figure 5:
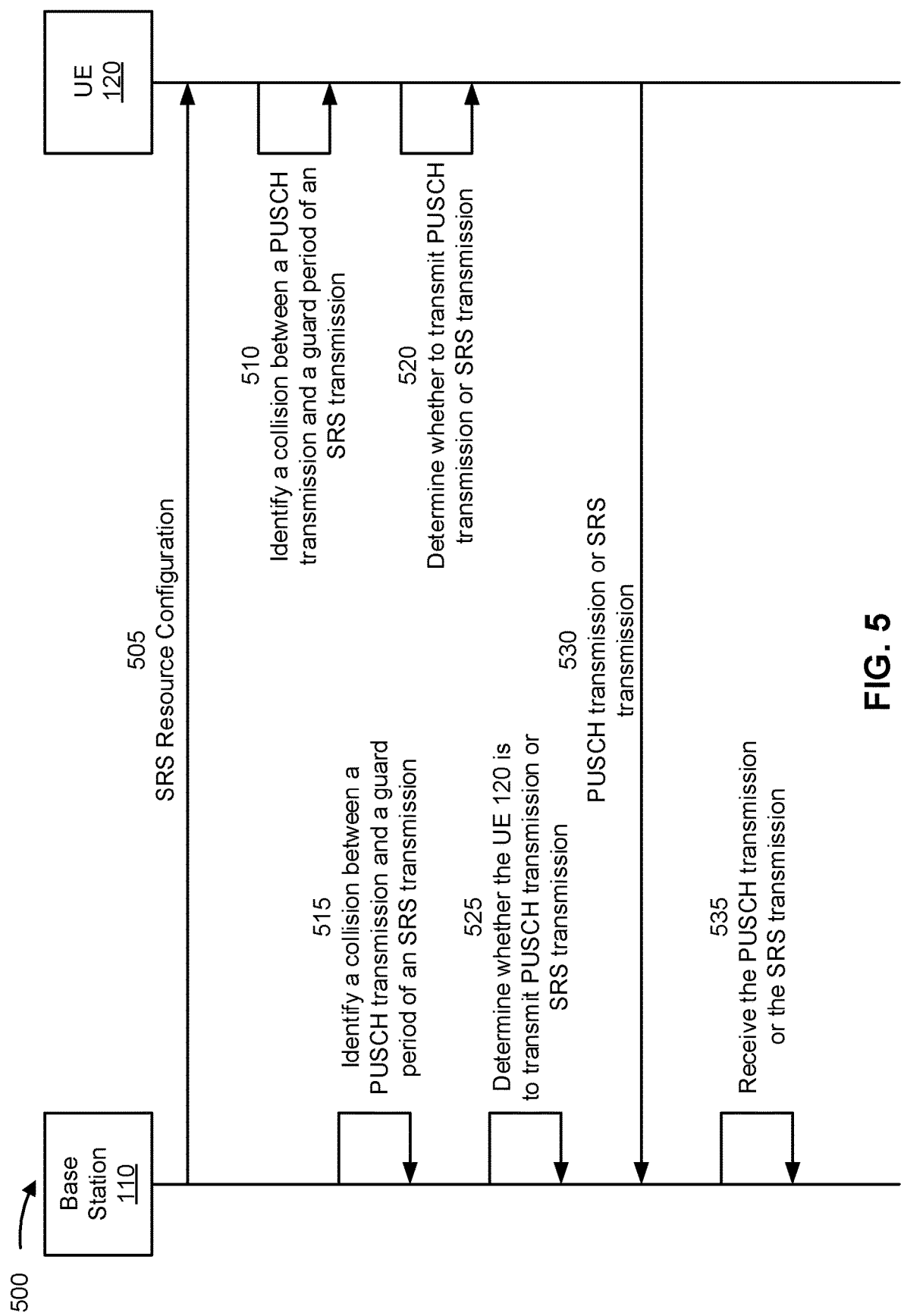
FIG. 5 is a diagram illustrating an example of collision handling for a collision between a sounding reference signal (SRS) guard period and a physical uplink shared channel (PUSCH) transmission, in accordance with the present disclosure.

FIG. 5 is a diagram illustrating an example 500 of collision handling for a collision between an SRS guard period and a PUSCH transmission, in accordance with the present disclosure. As shown in FIG. 5, a base station 110 and a UE 120 may communicate with one another in a wireless network (e.g., network 100).

As show by reference number 505, the base station 110 may transmit an SRS resource configuration. For example, the base station 110 may configure the UE 120 with one or more SRS resource sets to allocate resources for SRS transmissions by the UE 120. The configuration for SRS resource sets may be indicated in the SRS resource configuration (sometimes referred to as an SRS configuration, an SRS resource set configuration, and/or the like). In some aspects, the SRS resource configuration may be indicated in a radio resource control (RRC) message (e.g., an RC configuration message, and/or an RRC reconfiguration message). The SRS resource configuration may indicate one or more resources that are included in an SRS resource set. The resources may include time resources, frequency resources, spatial resources, and/or the like (e.g., a slot, a symbol, a resource block, a periodicity for the time resources, a beam, and/or a spatial reference).

The SRS resource configuration may indicate one or more antenna ports via which an SRS is to be transmitted in an SRS resource (e.g., in a time-frequency resource, a spatial resource, and/or the like). Thus, the SRS resource configuration for an SRS resource set may indicate one or more resources in which an SRS is to be transmitted and may indicate one or more antenna ports on which the SRS is to be transmitted in those resources. In some aspects, the SRS configuration for an SRS resource set may indicate a usage (e.g., an SRS usage, sometimes referred to as a use case, which may be indicated in an SRS-ResourceSet information element) for the SRS resource set. For example, an SRS resource set may have a usage of antenna switching, codebook, non-codebook, beam management (sometimes referred to as uplink beam management), and/or the like.

An antenna switching SRS resource set may be used to indicate downlink channel state information (CSI) with reciprocity between an uplink and downlink channel. For example, when there is reciprocity between an uplink channel and a downlink channel, the base station 110 may use an antenna switching SRS (e.g., an SRS transmitted using a resource of an antenna switching SRS resource set) to acquire downlink CSI (e.g., to determine a downlink precoder to be used to communicate with the UE 120, and/or to estimate a downlink channel). Thus, in some cases, an antenna switching usage may be referred to as a downlink acquisition usage.

In some aspects, the SRS resource configuration may indicate a single antenna port for an SRS resource set. In some aspects, the SRS configuration may indicate multiple antenna ports for an SRS resource set (e.g., two antenna ports, three antenna ports, and/or another number of antenna ports). In some aspects, the SRS resource configuration may indicate a number of SRS resource sets configured for the UE 120. Additionally, or alternatively, the SRS configuration may indicate the usages for those SRS resource sets(s), thereby indicating a number of SRS resource sets configured for each specific usage. Additionally, or alternatively, the SRS configuration may indicate a time domain configuration for an SRS resource set, such as whether an SRS resource set is periodic, aperiodic, semi-persistent, and/or the like. Additionally, or alternatively, the SRS configuration may indicate a periodicity for an SRS resource set (e.g., how often SRS are to be transmitted in the time domain for the SRS resource set).

For example, the SRS resource configuration may indicate that an antenna switching SRS resource set includes a first SRS resource and a second SRS resource. Additionally, a capability of the UE 120 may indicate a quantity of SRS ports (e.g., a quantity of antenna ports) per SRS resource that is based at least in part on a number of antennas of the UE 120 (e.g., a supportedSRS-TxPortSwitch capability). For example, the capability of the UE 120 may indicate that the UE 120 has 4 antennas and each SRS resource is to be associated with 2 SRS ports. In some aspects, the supportedSRS-TxPortSwitch capability may be 2T4R, indicating up to 2 SRS resource sets may be supported and each SRS resource set may include 2 SRS resources. Each SRS resource may be transmitted at different symbols. Each SRS resource may be associated with 2 SRS ports. A first SRS resource may use a first 2 antenna ports and a second SRS resource may use a second 2 antenna ports. Thus, the antenna switching SRS may be transmitted in a first SRS transmission using the first SRS resource (e.g., a first time-frequency resource) using a first set of antenna ports of the UE 120 (e.g., antenna ports 0 and 1), and the SRS may be transmitted in a second SRS transmission using the second SRS resource (e.g., a second time-frequency resource) using a second set of antenna ports of the UE 120 (e.g., antenna ports 2 and 3).

In some aspects, the SRS resource configuration may indicate a priority level associated with the SRS resources. For example, the SRS resource configuration may indicate that the SRS resources are associated with a priority level 1 or a priority level 2 (e.g., as defined, or otherwise fixed, by a wireless communication standard, such as a 3GPP Specification). In some aspects, a priority level 1 may indicate a higher priority level (e.g., a higher importance) than a priority level 2. In some aspects, a priority level 1 may be associated with an aperiodic SRS resource. In some aspects, a priority level 2 may be associated with a semi-persistent SRS resource and a periodic SRS resource.

The SRS resource configuration may indicate that the SRS resource set includes one or more guard periods (e.g., a quantity of symbols in which the UE 120 is not to transmit any signals). For example, the SRS resource set may include a guard period between the first SRS transmission and the second SRS transmission (e.g., between the first SRS resource and the second SRS resource). Similarly, the SRS resource set may include a guard period after the second SRS transmission. For example, the second SRS transmission may be configured to use the second set of antenna ports of the UE 120 (antenna ports 2 and 3, for example). The UE 120 may be required to perform antenna switching to transmit a signal after the second SRS transmission (e.g., if an uplink transmission after the second SRS transmission uses the first set of antenna ports, such as antenna ports 0 and 1).

As shown by reference number 510, the UE 120 may identify a collision between a PUSCH transmission and a guard period of an SRS transmission. For example, the base station 110 may schedule the PUSCH transmission to occur in a next slot after the slot in which the SRS transmission is configured. The PUSCH transmission and the SRS transmission may be configured to be transmitted on a same component carrier (e.g., using a same frequency).

The UE 120 may identify the collision based at least in part on determining that the second SRS transmission is associated with a guard period (e.g., based at least in part on determining that the UE 120 must perform antenna switching between the second SRS transmission and the PUSCH transmission). In some aspects, the UE 120 may identify the collision based at least in part on determining that the SRS resource set includes the first SRS resource and the second SRS resource and determining that the SRS usage includes antenna switching. In some aspects, the UE 120 may identify the collision based at least in part on determining that the SRS transmission is configured to be transmitted such that a last symbol of the SRS transmission (e.g., a last symbol of the second SRS transmission) is a last symbol of a first slot and determining that the PUSCH transmission is scheduled or configured to be transmitted in a next slot after the first slot (e.g., a slot directly subsequent to the first slot in the time domain). The first slot may be an uplink slot or a special slot. The next slot after the first slot may be an uplink slot.

As shown by reference number 515, the base station 110 may identify the collision in a similar manner as described above with respect to the UE 120. For example, the base station 110 may identify the SRS resource configuration and a scheduled or configured (e.g., by the base station 110) PUSCH transmission and may identify the collision between a guard period of an SRS transmission and the PUSCH transmission.

As shown by reference number 520, the UE 120 may determine whether to transmit the PUSCH transmission or the SRS transmission. For example, the UE 120 may determine an action to perform (e.g., not transmit the SRS transmission or not transmit the PUSCH transmission) to mitigate the collision based at least in part on identifying the collision. The UE 120 may determine whether to transmit the PUSCH transmission or the SRS transmission based at least in part on a priority rule associated with the collision. The priority rule may be based at least in part on the time domain configuration for the SRS transmission (e.g., aperiodic, periodic, or semi-persistent), a content of the PUSCH transmission, and/or a priority level of the SRS transmission (e.g., that may be indicated by the time domain configuration for the SRS transmission), among other examples.

For example, the PUSCH transmission may be a time-division multiplexed PUSCH transmission. That is, the PUSCH transmission and a physical uplink control channel (PUCCH) transmission may be combined using time-division multiplexing. The PUCCH transmission may include a channel state information (CSI) report, a layer one (L1) reference signal receive power (RSRP) report, an L1 signal-to-interference-plus-noise ratio (SINR) report, a hybrid automatic repeat request (HARQ-ACK), a link recovery request, and/or a scheduling request, among other examples.

In some aspects, the priority rule may indicate that the UE 120 is to refrain from transmitting the SRS transmission (e.g., not transmit the SRS transmission and transmit the PUSCH transmission) when the SRS transmission is a semi-persistent SRS transmission or a periodic SRS transmission (e.g., a priority level 2 SRS transmission) and the PUSCH transmission is time-division multiplexed with a PUCCH transmission that includes a CSI report, an L1-RSRP report, or an L1-SINR report.

In some aspects, the priority rule may indicate that the UE 120 is to refrain from transmitting the SRS transmission (e.g., not transmit the SRS transmission and transmit the PUSCH transmission) when the SRS transmission is a semi-persistent SRS transmission, a periodic SRS transmission, or an aperiodic SRS transmission and the PUSCH transmission is time-division multiplexed with a PUCCH transmission that includes a HARQ-ACK, a link recovery request, or a scheduling request.

In some aspects, the priority rule may indicate that the UE 120 is to refrain from transmitting the PUSCH transmission (e.g., not transmit the PUSCH transmission and transmit the SRS transmission) when the SRS transmission is an aperiodic SRS transmission (e.g., a priority level 1 SRS transmission) and the PUSCH transmission is not time-division multiplexed with a PUCCH transmission. In some aspects, the priority rule may indicate that the UE 120 is to refrain from transmitting the PUSCH transmission when the SRS transmission is an aperiodic SRS transmission and the PUSCH transmission is time-division multiplexed with a PUCCH transmission that includes a CSI report, an L1-RSRP report, or an L1-SINR report.

In some aspects, the priority rule may be based at least in part on a priority level of the SRS transmission. For example, as described above, an SRS transmission may be a priority level 1, or a priority level 2, among other examples (e.g., in some cases, the priority levels may be defined, or otherwise fixed, by a 3GPP specification). The UE 120 may identify a priority level of an SRS transmission based at least in part on an indication from the base station 110 (e.g., in the SRS resource configuration), and/or based at least in part on a priority indicator field associated with the SRS transmission, among other examples. For example, SRS transmissions may be prioritized by traffic type (e.g., Enhanced Mobile Broadband (eMBB) SRS transmissions may have a different priority level than a priority level of an ultra-reliable low latency communication (URLLC) SRS transmission).

In some aspects, the priority rule may indicate that the UE 120 is to refrain from transmitting the PUSCH transmission (and is to transmit the SRS transmission) when the SRS transmission is a priority level 1 SRS transmission (e.g., an aperiodic SRS transmission). For example, the UE 120 may drop (e.g., not transmit) symbols associated with the PUSCH transmission that overlap or collide with the SRS transmission, as described herein. In some aspects, the priority rule may indicate that the UE 120 is to refrain from transmitting the SRS transmission (and is to transmit the PUSCH transmission) when the SRS transmission is a priority level 2 SRS transmission (e.g., a semi-persistent SRS transmission or a periodic SRS transmission).

Refraining from transmitting the SRS transmission may include dropping each symbol associated with the SRS transmission. In some aspects, refraining from transmitting the SRS transmission may include refraining from transmitting the second SRS transmission and dropping each symbol associated with the second SRS transmission. In some aspects, the UE 120 may determine that the second SRS transmission is to be dropped and the first SRS transmission is to be transmitted. For example, the SRS transmission may be associated with additional usages (e.g., a codebook usage, a non-codebook usage, a beam management usage, and/or the like). The UE 120 may determine that the second SRS transmission is not to be transmitted (e.g., based at least in part on the priority rule, as described above) and may transmit the first SRS transmission for another usage (e.g., other than antenna switching). For example, as described above, the first SRS transmission may be configured to use a same set of antenna ports as the PUSCH transmission (antenna ports 0 and 1, for example). As a result, if the UE 120 does not transmit the second SRS transmission, the UE 120 does not have to perform antenna switching between the first SRS transmission and the PUSCH transmission. Therefore, the SRS transmission may not include a guard period and no collision may occur associated with the first SRS transmission and the PUSCH transmission.

As shown by reference number 525, the base station 110 may determine the action to be performed by the UE 120 (e.g., whether the UE 120 is to transmit the PUSCH transmission or the SRS transmission) based at least in part on identifying the collision in a similar manner as described above with respect to the UE 120. For example, the base station 110 may apply one or more priority rules (e.g., the priority rules described above with respect to the UE 120) to determine whether the UE 120 is to refrain from transmitting the SRS transmission (e.g., the entire SRS transmission, the second SRS transmission, and/or the like) or the PUSCH transmission.

As shown by reference number 530, the UE 120 may transmit the PUSCH transmission or the SRS transmission based at least in part on determining whether to transmit the PUSCH transmission or the SRS transmission (e.g., based at least in part on the one or more priority rules, as described above). In some aspects, the UE 120 may transmit only the PUSCH transmission. In some aspects, the UE 120 may transmit only the SRS transmission (e.g., the first SRS transmission, the second SRS transmission, and/or the like). In some aspects, the UE 120 may transmit the PUSCH transmission and the first SRS transmission (e.g., and not transmit the second SRS transmission).

As shown by reference number 535, the UE 120 may selectively receive the PUSCH transmission or the SRS transmission based at least in part on determining the action to be performed by the UE 120 (e.g., based at least in part on determining whether the UE 120 is to transmit the PUSCH transmission or the SRS transmission). For example, the base station 110 may determine that the UE 120 is to drop the SRS transmission and transmit the PUSCH transmission. The base station 110 may receive the PUSCH transmission using the resources allocated for the PUSCH transmission. Similarly, the base station 110 may receive the first SRS transmission using the resources allocated for the first SRS transmission and may receive the PUSCH transmission using the resources allocated for the PUSCH transmission.

As a result, the UE 120 and/or the base station 110 may ensure that uplink communications are not destroyed or dropped the collision between the guard period of the SRS transmission and the PUSCH transmission is identified. This may conserve network resources that would have otherwise been used to transmit retransmissions of dropped uplink communications, may reduce delays in uplink transmissions, and/or the like.

As indicated above, FIG. 5 is provided as an example. Other examples may differ from what is described with respect to FIG. 5.

Figure 6:
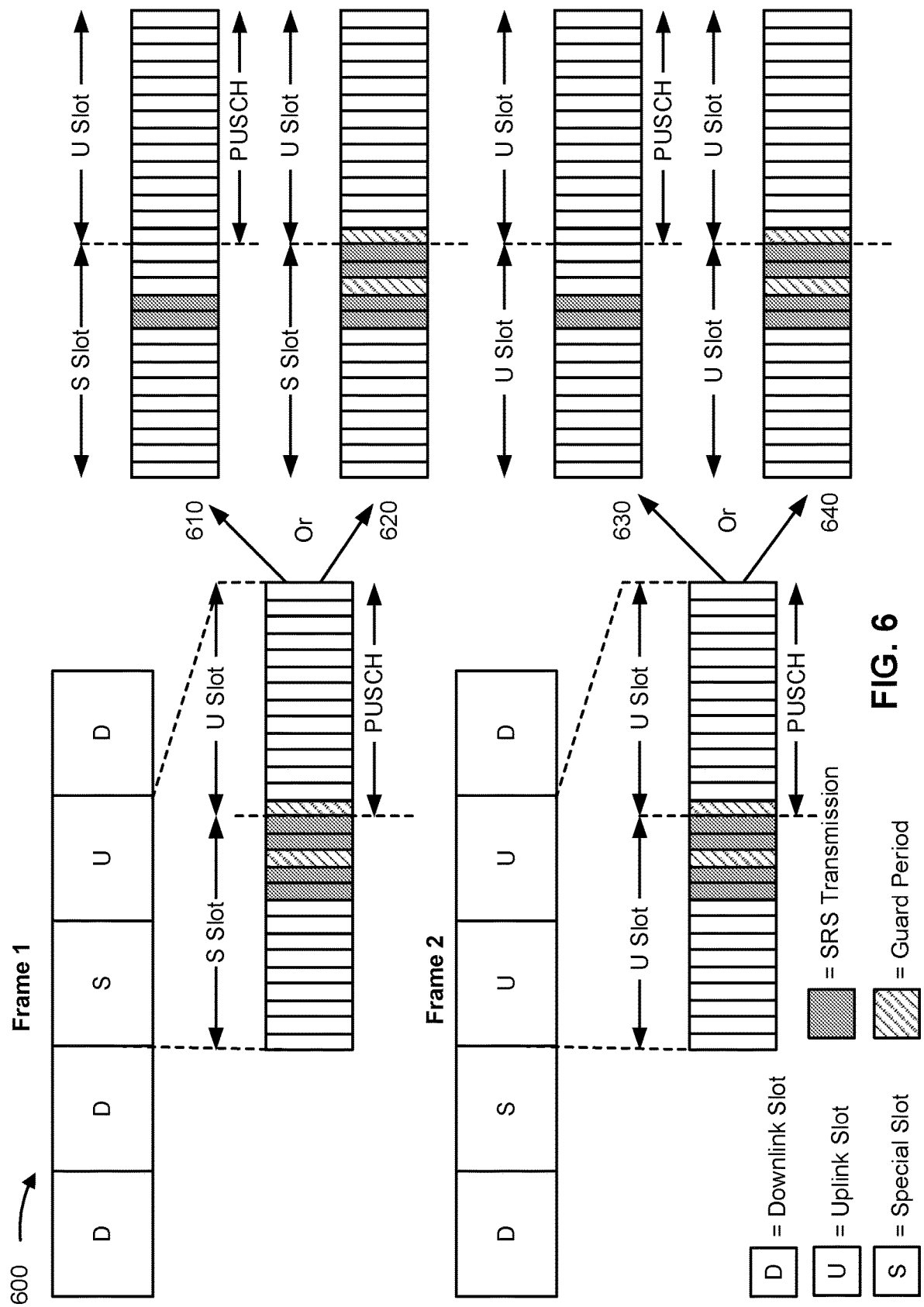
FIG. 6 is a diagram illustrating an example associated with one or more examples of a collision between an SRS guard period and a PUSCH transmission, in accordance with the present disclosure.

FIG. 6 is a diagram illustrating one or more example(s) 600 of a collision between an SRS guard period and a PUSCH transmission, in accordance with the present disclosure.

As shown in FIG. 6, example(s) 600 may include a first radio frame (e.g., frame 1) and a second radio frame (e.g., frame 2). The first radio frame and the second radio frame may be associated with a same component carrier (e.g., a same frequency) and/or a different component carrier. The first radio frame and the second radio frame may be associated with the same time domain resources or a different time domain resources. In some aspects, the first radio frame and the second radio frame may be associated with the same frame structure (e.g., the first radio frame may occur prior to the second radio frame in the time domain in the same frame structure).

As shown in FIG. 6, the first radio frame and the second radio frame may include one or more downlink slots (e.g., in which downlink communications may be scheduled), one or more uplink slots (e.g., in which uplink communications may be scheduled), and one or more special slots (e.g., in which downlink communications or uplink communications may be scheduled).

As described above, an SRS transmission may be configured to use resources of an uplink slot or a special slot. For example, as shown in the first radio frame, an SRS transmission may be configured with a first set of resources (e.g., for a first SRS transmission) and a second set of resources (e.g., for a second SRS transmission) in a special slot. The second set of resources may include a last symbol of the special slot (e.g., the second set of resources may be the last two symbols of the special slot, as shown in FIG. 6). The first SRS transmission and the second SRS transmission may be associated with an antenna switching usage, as described above. As a result, a guard period of a quantity of symbols (e.g., one symbol, as shown in FIG. 6) may be configured after the first set of SRS resources and/or after the second set of SRS resources. As the second set of SRS resources may include the last symbol of the special slot, the guard period after the second set of SRS resources may occupy one or more symbol(s) of a next slot after the special slot. As described above with respect to FIG. 5, a PUSCH transmission may be scheduled in an uplink slot that is directly after the special slot in the time domain (e.g., such that one or more symbols of the PUSCH transmission includes the first symbol of the uplink slot that is directly after the special slot). As a result, the guard period of the second set of SRS resources and the symbols allocated for the PUSCH transmission may overlap (e.g., the first symbol in the uplink slot after the special slot may be allocated for the PUSCH transmission and may be associated with the guard period of the second set of SRS resources). Therefore, a UE 120 may identify a collision in the first radio frame between the SRS guard period and the PUSCH transmission. The UE 120 may determine whether to transmit the PUSCH transmission (for example, as shown by reference number 610) or the SRS transmission (for example, as shown by reference number 620) to mitigate the collision, as described above with respect to FIG. 5.

Similarly, as shown in the second radio frame, an SRS transmission may be configured in an uplink slot. The SRS transmission may occupy similar symbols as described above with respect to the special slot and the first radio frame (e.g., a second set of SRS resources may include a last symbol of the uplink slot). A second uplink slot may be configured directly after the uplink slot that includes the SRS transmission in the time domain. Similar to the uplink slot describe above with respect to the first radio frame, a PUSCH transmission may be scheduled in the second uplink slot (e.g., such that one or more symbols of the PUSCH transmission includes the first symbol of the second uplink slot) and a guard period associated with the SRS transmission may include one or more symbol(s) that includes the first symbol of the second uplink slot. Therefore, the UE 120 may identify a collision in the second radio frame between the SRS guard period and the PUSCH transmission. The UE 120 may determine whether to transmit the PUSCH transmission (for example, as shown by reference number 630) or the SRS transmission (for example, as shown by reference number 640) to mitigate the collision, as described above with respect to FIG. 5.

As indicated above, FIG. 6 is provided as an example. Other examples may differ from what is described with respect to FIG. 6.

Figure 7:
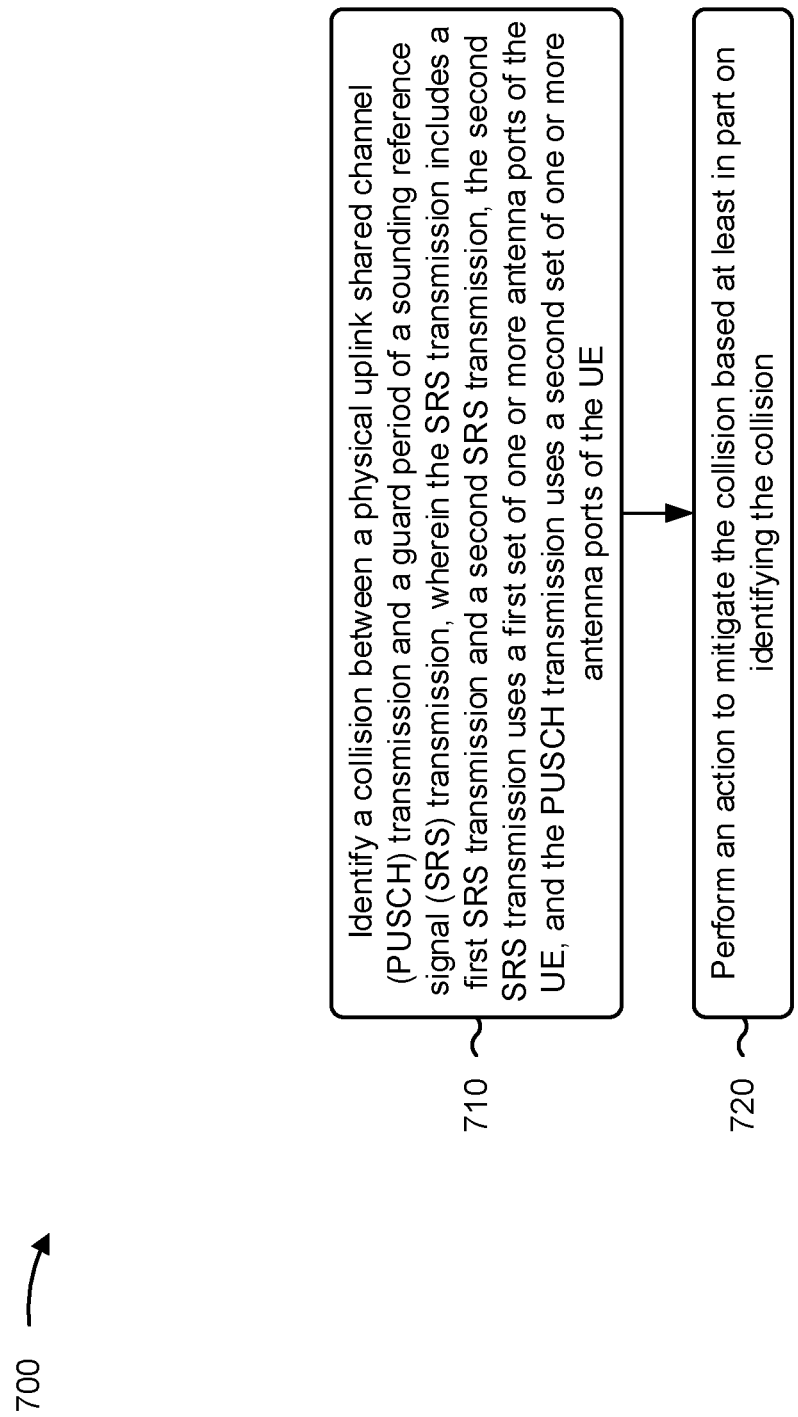
FIGS. 7-8 are diagrams illustrating example processes associated with collision handling for a collision between an SRS guard period and a PUSCH transmission, in accordance with the present disclosure.

FIG. 7 is a diagram illustrating an example process 700 performed, for example, by a UE, in accordance with the present disclosure. Example process 700 is an example where the UE (e.g., UE 120) performs operations associated with collision handling for a collision between an SRS guard period and a PUSCH transmission.

As shown in FIG. 7, in some aspects, process 700 may include identifying a collision between a PUSCH transmission and a guard period of an SRS transmission, wherein the SRS transmission includes a first SRS transmission and a second SRS transmission, the second SRS transmission uses a first set of one or more antenna ports of the UE, and the PUSCH transmission uses a second set of one or more antenna ports of the UE (block 710). For example, the UE (e.g., using receive processor 258, transmit processor 264, controller/processor 280, memory 282, and/or the like) may identify a collision between a PUSCH transmission and a guard period of an SRS transmission, as described above. In some aspects, the SRS transmission includes a first SRS transmission and a second SRS transmission, the second SRS transmission uses a first set of one or more antenna ports of the UE, and the PUSCH transmission uses a second set of one or more antenna ports of the UE. In some aspects, the UE may identify a collision between a PUSCH transmission, and a guard period of an SRS transmission based at least in part on resources associated with the PUSCH transmission and resources associated with the guard period.

As further shown in FIG. 7, in some aspects, process 700 may include performing an action to mitigate the collision based at least in part on identifying the collision (block 720). For example, the UE (e.g., using receive processor 258, transmit processor 264, controller/processor 280, memory 282, and/or the like) may perform an action to mitigate the collision based at least in part on identifying the collision, as described above.

Process 700 may include additional aspects, such as any single aspect or any combination of aspects described below and/or in connection with one or more other processes described elsewhere herein.

In a first aspect, the PUSCH transmission and the SRS transmission are configured to be transmitted on a same component carrier.

In a second aspect, alone or in combination with the first aspect, process 700 includes receiving a configuration indicating that an SRS usage includes antenna switching.

In a third aspect, alone or in combination with one or more of the first and second aspects, performing the action comprises refraining from transmitting the SRS transmission.

In a fourth aspect, alone or in combination with one or more of the first through third aspects, the SRS transmission is configured to be transmitted such that a last symbol of the SRS transmission is a last symbol of a first slot, and the PUSCH transmission is time-division multiplexed with a physical uplink control channel (PUCCH) transmission and is scheduled to be transmitted in a next slot after the first slot.

In a fifth aspect, alone or in combination with one or more of the first through fourth aspects, the PUCCH transmission includes at least one of a channel state information report, a layer one (L1) reference signal receive power report, or an L1 signal-to-interference-plus-noise ratio report.

In a sixth aspect, alone or in combination with one or more of the first through fifth aspects, the SRS transmission is a semi-persistent SRS transmission or a periodic SRS transmission.

In a seventh aspect, alone or in combination with one or more of the first through sixth aspects, the PUCCH transmission includes at least one of a hybrid automatic repeat request, a link recovery request, or a scheduling request.

In an eighth aspect, alone or in combination with one or more of the first through seventh aspects, the SRS transmission is a semi-persistent SRS transmission, a periodic SRS transmission, or an aperiodic SRS transmission.

In a ninth aspect, alone or in combination with one or more of the first through eighth aspects, performing the action comprises refraining from transmitting the second SRS transmission, and dropping each symbol associated with the second SRS transmission.

In a tenth aspect, alone or in combination with one or more of the first through ninth aspects, the first SRS transmission uses the second set of antenna ports of the UE, and performing the action comprises transmitting the first SRS transmission.

In an eleventh aspect, alone or in combination with one or more of the first through tenth aspects, performing the action includes identifying a priority level associated with the SRS transmission; refraining from transmitting the SRS transmission based at least in part on the priority level; and transmitting the PUSCH transmission.

In an twelfth aspect, alone or in combination with one or more of the first through eleventh aspects, the SRS transmission is an aperiodic SRS transmission triggered to be transmitted such that a last symbol of the aperiodic SRS transmission is the last symbol of a first slot, the PUSCH transmission is scheduled to be transmitted in a next slot after the first slot, and performing the action comprises refraining from transmitting the PUSCH transmission.

In a thirteenth aspect, or in combination with one or more of the first through twelfth aspects, performing the action includes identifying a priority level associated with the SRS transmission; refraining from transmitting the PUCCH transmission based at least in part on the priority level of the SRS transmission; and transmitting the SRS transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
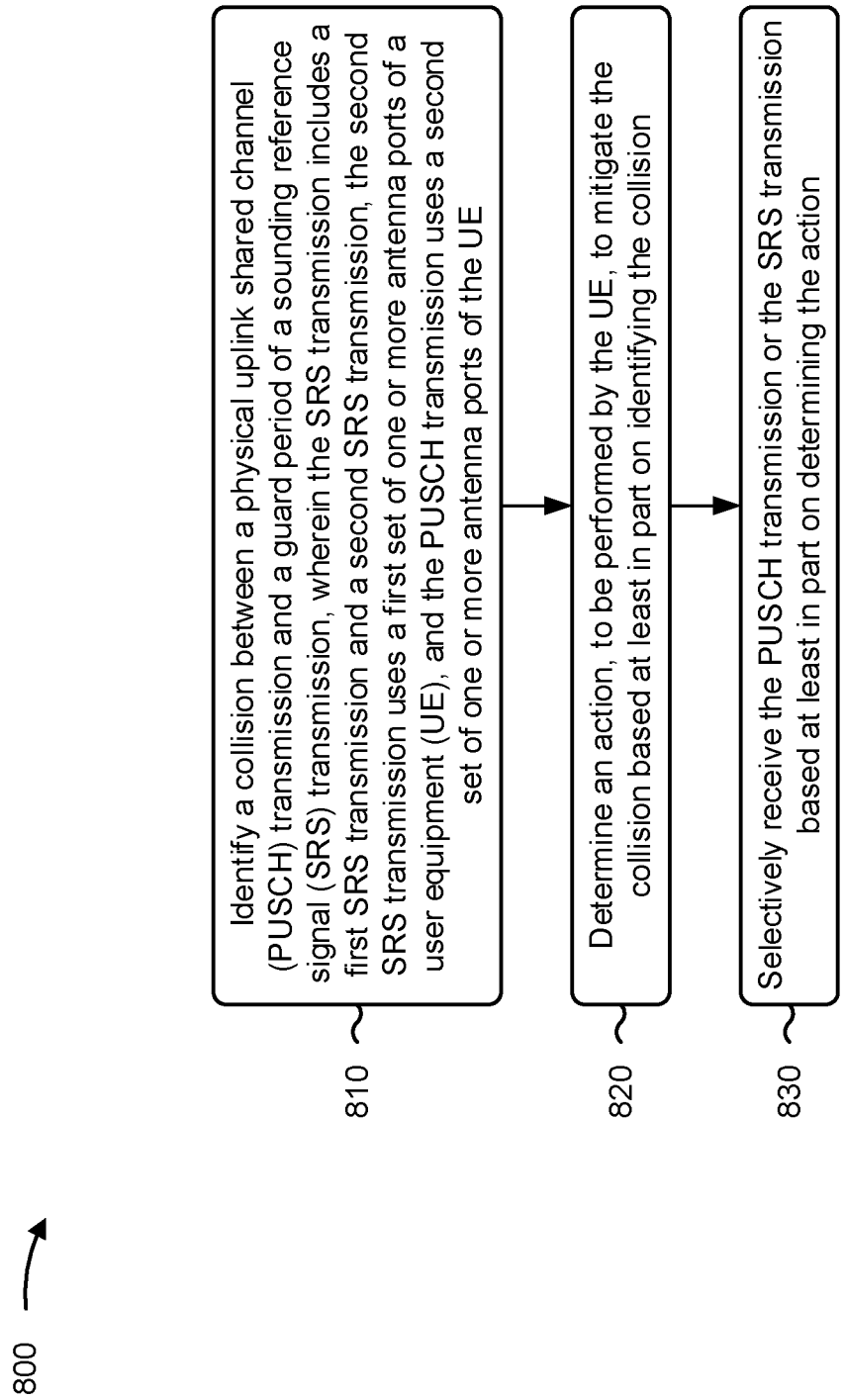

FIG. 8 is a diagram illustrating an example process 800 performed, for example, by a base station, in accordance with the present disclosure. Example process 800 is an example where the base station (e.g., base station 110) performs operations associated with collision handling for a collision between an SRS guard period and a PUSCH transmission.

As shown in FIG. 8, in some aspects, process 800 may include identifying a collision between a PUSCH transmission and a guard period of an SRS transmission, wherein the SRS transmission includes a first SRS transmission and a second SRS transmission, the second SRS transmission uses a first set of one or more antenna ports of a UE, and the PUSCH transmission uses a second set of one or more antenna ports of the UE (block 810). For example, the base station (e.g., using transmit processor 220, receive processor 238, controller/processor 240, memory 242, and/or the like) may identify a collision between a PUSCH transmission and a guard period of an SRS transmission, as described above. In some aspects, the SRS transmission includes a first SRS transmission and a second SRS transmission, the second SRS transmission uses a first set of one or more antenna ports of a UE, and the PUSCH transmission uses a second set of one or more antenna ports of the UE. In some aspects, the base station may identify a collision between a PUSCH transmission, and a guard period of an SRS transmission based at least in part on resources associated with the PUSCH transmission and resources associated with the guard period.

As further shown in FIG. 8, in some aspects, process 800 may include determining an action, to be performed by the UE, to mitigate the collision based at least in part on identifying the collision (block 820). For example, the base station (e.g., using transmit processor 220, receive processor 238, controller/processor 240, memory 242, and/or the like) may determine an action, to be performed by the UE, to mitigate the collision based at least in part on identifying the collision, as described above.

As further shown in FIG. 8, in some aspects, process 800 may include selectively receiving the PUSCH transmission or the SRS transmission based at least in part on determining the action (block 830). For example, the base station (e.g., using transmit processor 220, receive processor 238, controller/processor 240, memory 242, and/or the like) may selectively receive the PUSCH transmission or the SRS transmission based at least in part on determining the action, as described above.

Process 800 may include additional aspects, such as any single aspect or any combination of aspects described below and/or in connection with one or more other processes described elsewhere herein.

In a first aspect, the PUSCH transmission and the SRS transmission are configured to be transmitted on a same component carrier.

In a second aspect, alone or in combination with the first aspect, process 800 includes transmitting a configuration indicating that an SRS usage includes antenna switching.

In a third aspect, alone or in combination with one or more of the first and second aspects, determining the action to be performed by the UE comprises determining that the UE is to refrain from transmitting the SRS transmission.

In a fourth aspect, alone or in combination with one or more of the first through third aspects, the SRS transmission is configured to be transmitted such that a last symbol of the SRS transmission is a last symbol of a first slot, and the PUSCH transmission is time-division multiplexed with a PUCCH transmission and is scheduled to be transmitted in a next slot after the first slot.

In a fifth aspect, alone or in combination with one or more of the first through fourth aspects, the PUCCH transmission includes at least one of a channel state information report, a L1 reference signal receive power report, or an L1 signal-to-interference-plus-noise ratio report.

In a sixth aspect, alone or in combination with one or more of the first through fifth aspects, the SRS transmission is a semi-persistent SRS transmission or a periodic SRS transmission.

In a seventh aspect, alone or in combination with one or more of the first through sixth aspects, the PUCCH transmission includes at least one of a hybrid automatic repeat request, a link recovery request, or a scheduling request.

In an eighth aspect, alone or in combination with one or more of the first through seventh aspects, the SRS transmission is a semi-persistent SRS transmission, a periodic SRS transmission, or an aperiodic SRS transmission.

In a ninth aspect, alone or in combination with one or more of the first through eighth aspects, determining the action to be performed by the UE comprises determining that the UE is to refrain from transmitting the second SRS transmission, and determining that the UE is to drop each symbol associated with the second SRS transmission.

In a tenth aspect, alone or in combination with one or more of the first through ninth aspects, the first SRS transmission uses the second set of antenna ports of the UE, and determining the action to be performed by the UE comprises determining that the UE is to transmit the first SRS transmission.

In an eleventh aspect, alone or in combination with one or more of the first through tenth aspects, determining the action to be performed by the UE includes determining a priority level of the SRS transmission, and determining that the UE is to refrain from transmitting the SRS transmission based at least in part on the priority level of the SRS transmission; and selectively receiving the PUSCH transmission or the SRS transmission includes receiving the PUSCH transmission.

In an twelfth aspect, alone or in combination with one or more of the first through eleventh aspects, the SRS transmission is an aperiodic SRS transmission triggered to be transmitted such that a last symbol of the aperiodic SRS transmission is the last symbol of a first slot, the PUSCH transmission is scheduled to be transmitted in a next slot after the first slot, and determining the action to be performed by the UE comprises determining that the UE is to refrain from transmitting the PUSCH transmission.

In a thirteenth aspect, alone or in combination with one or more of the first through twelfth aspects, selectively receiving the PUSCH transmission or the SRS transmission comprises selectively receiving the second SRS transmission or the PUSCH transmission based at least in part on determining the action.

In a fourteenth aspect, alone or in combination with one or more of the first through thirteenth aspects, determining the action to be performed by the UE includes determining a priority level of the SRS transmission, and determining that the UE is to refrain from transmitting the PUSCH transmission based at least in part on the priority level of the SRS transmission; and selectively receiving the PUSCH transmission or the SRS transmission includes receiving the SRS transmission.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a user equipment (UE), comprising: identifying a collision between a physical uplink shared channel (PUSCH) transmission and a guard period of a sounding reference signal (SRS) transmission, wherein the SRS transmission includes a first SRS transmission and a second SRS transmission, the second SRS transmission uses a first set of one or more antenna ports of the UE, and the PUSCH transmission uses a second set of one or more antenna ports of the UE; and performing an action to mitigate the collision based at least in part on identifying the collision.

Aspect 2: The method of Aspect 1, wherein the PUSCH transmission and the SRS transmission are configured to be transmitted on a same component carrier.

Aspect 3: The method of any of Aspects 1-2, further comprising: receiving a configuration indicating that an SRS usage includes antenna switching.

Aspect 4: The method of any of Aspects 1-3, wherein performing the action comprises: refraining from transmitting the SRS transmission.

Aspect 5: The method of Aspect 4, wherein the SRS transmission is configured to be transmitted such that a last symbol of the SRS transmission is a last symbol of a first slot, and wherein the PUSCH transmission is time-division multiplexed with a physical uplink control channel (PUCCH) transmission and is scheduled to be transmitted in a next slot after the first slot.

Aspect 6: The method of Aspect 5, wherein the PUCCH transmission includes at least one of: a channel state information report, a layer one (L1) reference signal receive power report, or an L1 signal-to-interference-plus-noise ratio report.

Aspect 7: The method of Aspect 6, wherein the SRS transmission is a semi-persistent SRS transmission or a periodic SRS transmission.

Aspect 8: The method of any of Aspects 5-7, wherein the PUCCH transmission includes at least one of: a hybrid automatic repeat request, a link recovery request, or a scheduling request.

Aspect 9: The method of Aspect 8, wherein the SRS transmission is a semi-persistent SRS transmission, a periodic SRS transmission, or an aperiodic SRS transmission.

Aspect 10: The method of any of Aspects 4-9, wherein performing the action comprises: refraining from transmitting the second SRS transmission; and dropping each symbol associated with the second SRS transmission.

Aspect 11: The method of Aspect 10, wherein the first SRS transmission uses the second set of antenna ports of the UE, and wherein performing the action comprises: transmitting the first SRS transmission.

Aspect 12: The method of any of Aspects 4-11, wherein performing the action comprises: identifying a priority level associated with the SRS transmission; refraining from transmitting the SRS transmission based at least in part on the priority level; and transmitting the PUSCH transmission.

Aspect 13: The method of any of Aspects 1-3, wherein the SRS transmission is an aperiodic SRS transmission triggered to be transmitted such that a last symbol of the aperiodic SRS transmission is the last symbol of a first slot, wherein the PUSCH transmission is scheduled to be transmitted in a next slot after the first slot, and wherein performing the action comprises: refraining from transmitting the PUSCH transmission.

Aspect 14: The method of any of Aspects 1-3, wherein performing the action comprises: identifying a priority level associated with the SRS transmission; refraining from transmitting the PUSCH transmission based at least in part on the priority level of the SRS transmission; and transmitting the SRS transmission.

Aspect 15: A method of wireless communication performed by a base station, comprising: identifying a collision between a physical uplink shared channel (PUSCH) transmission and a guard period of a sounding reference signal (SRS) transmission, wherein the SRS transmission includes a first SRS transmission and a second SRS transmission, the second SRS transmission uses a first set of one or more antenna ports of a user equipment (UE), and the PUSCH transmission uses a second set of one or more antenna ports of the UE; determining an action, to be performed by the UE, to mitigate the collision based at least in part on identifying the collision; and selectively receiving the PUSCH transmission or the SRS transmission based at least in part on determining the action.

Aspect 16: The method of Aspect 15, wherein the PUSCH transmission and the SRS transmission are configured to be transmitted on a same component carrier.

Aspect 17: The method of any of Aspects 15-16, further comprising: transmitting a configuration indicating that an SRS usage includes antenna switching.

Aspect 18: The method of any of Aspects 15-17, wherein determining the action to be performed by the UE comprises: determining that the UE is to refrain from transmitting the SRS transmission.

Aspect 19: The method of Aspect 18, wherein the SRS transmission is configured to be transmitted such that a last symbol of the SRS transmission is a last symbol of a first slot, and wherein the PUSCH transmission is time-division multiplexed with a physical uplink control channel (PUCCH) transmission and is scheduled to be transmitted in a next slot after the first slot.

Aspect 20: The method of Aspect 19, wherein the PUCCH transmission includes at least one of: a channel state information report, a layer one (L1) reference signal receive power report, or an L1 signal-to-interference-plus-noise ratio report.

Aspect 21: The method of Aspect 20, wherein the SRS transmission is a semi-persistent SRS transmission or a periodic SRS transmission.

Aspect 22: The method of any of Aspects 19-21, wherein the PUCCH transmission includes at least one of: a hybrid automatic repeat request, a link recovery request, or a scheduling request.

Aspect 23: The method of Aspect 22, wherein the SRS transmission is a semi-persistent SRS transmission, a periodic SRS transmission, or an aperiodic SRS transmission.

Aspect 24: The method of any of Aspects 18-23, wherein determining the action to be performed by the UE comprises: determining that the UE is to refrain from transmitting the second SRS transmission; and determining that the UE is to drop each symbol associated with the second SRS transmission.

Aspect 25: The method of Aspect 24, wherein the first SRS transmission uses the second set of antenna ports of the UE, and wherein determining the action to be performed by the UE comprises: determining that the UE is to transmit the first SRS Aspect 26: The method of Aspect 18-25, wherein determining the action to be performed by the UE comprises: determining a priority level of the SRS transmission; and determining that the UE is to refrain from transmitting the SRS transmission based at least in part on the priority level of the SRS transmission; wherein selectively receiving the PUSCH transmission or the SRS transmission comprises: receiving the PUSCH transmission.

Aspect 27: The method of any of Aspects 15-26, wherein the SRS transmission is an aperiodic SRS transmission triggered to be transmitted such that a last symbol of the aperiodic SRS transmission is the last symbol of a first slot, wherein the PUSCH transmission is scheduled to be transmitted in a next slot after the first slot, and wherein determining the action to be performed by the UE comprises: determining that the UE is to refrain from transmitting the PUSCH transmission.

Aspect 28: The method of any of Aspects 15-27, wherein selectively receiving the PUSCH transmission or the SRS transmission comprises: selectively receiving the second SRS transmission or the PUSCH transmission based at least in part on determining the action.

Aspect 29: The method of any of Aspects 15-17, wherein determining the action to be performed by the UE comprises: determining a priority level of the SRS transmission; and determining that the UE is to refrain from transmitting the PUSCH transmission based at least in part on the priority level of the SRS transmission; wherein selectively receiving the PUSCH transmission or the SRS transmission comprises: receiving the SRS transmission.

Aspect 30: An apparatus for wireless communication at a device, comprising a processor; memory coupled with the processor; and instructions stored in the memory and executable by the processor to cause the apparatus to perform the method of one or more Aspects of Aspects 1-14.

Aspect 31: A device for wireless communication, comprising a memory and one or more processors coupled to the memory, the memory and the one or more processors configured to perform the method of one or more Aspects of Aspects 1-14.

Aspect 32: An apparatus for wireless communication, comprising at least one means for performing the method of one or more Aspects of Aspects 1-14.

Aspect 33: A non-transitory computer-readable medium storing code for wireless communication, the code comprising instructions executable by a processor to perform the method of one or more Aspects of Aspects 1-14.

Aspect 34: A non-transitory computer-readable medium storing a set of instructions for wireless communication, the set of instructions comprising one or more instructions that, when executed by one or more processors of a device, cause the device to perform the method of one or more Aspects of Aspects 1-14.

Aspect 35: An apparatus for wireless communication at a device, comprising a processor; memory coupled with the processor; and instructions stored in the memory and executable by the processor to cause the apparatus to perform the method of one or more Aspects of Aspects 15-29.

Aspect 36: A device for wireless communication, comprising a memory and one or more processors coupled to the memory, the memory and the one or more processors configured to perform the method of one or more Aspects of Aspects 15-29.

Aspect 37: An apparatus for wireless communication, comprising at least one means for performing the method of one or more Aspects of Aspects 15-29.

Aspect 38: A non-transitory computer-readable medium storing code for wireless communication, the code comprising instructions executable by a processor to perform the method of one or more Aspects of Aspects 15-29.

Aspect 39: A non-transitory computer-readable medium storing a set of instructions for wireless communication, the set of instructions comprising one or more instructions that, when executed by one or more processors of a device, cause the device to perform the method of one or more Aspects of Aspects 15-29.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   identifying a collision between a physical uplink shared channel (PUSCH) transmission and a guard period of a sounding reference signal (SRS) transmission, wherein:
   the SRS transmission includes a first SRS transmission and a second SRS transmission,
   the second SRS transmission uses a first set of one or more antenna ports of the UE, and the PUSCH transmission uses a second set of one or more antenna ports of the UE; and performing an action to mitigate the collision based at least in part on identifying the collision.

2. The method of claim 1, wherein the PUSCH transmission and the SRS transmission are configured to be transmitted on a same component carrier.

3. The method of claim 1, further comprising:
receiving a configuration indicating that an SRS usage includes antenna switching.

4. The method of claim 1, wherein performing the action comprises:
refraining from transmitting the SRS transmission.

5. The method of claim 4, wherein the SRS transmission is configured to be transmitted such that a last symbol of the SRS transmission is a last symbol of a first slot, and
wherein the PUSCH transmission is time-division multiplexed with a physical uplink control channel (PUCCH) transmission and is scheduled to be transmitted in a next slot after the first slot.

6. The method of claim 5, wherein the PUCCH transmission includes at least one of:
a channel state information report,
a layer one (L1) reference signal receive power report, or
an L1 signal-to-interference-plus-noise ratio report.

7. The method of claim 6, wherein the SRS transmission is a semi-persistent SRS transmission or a periodic SRS transmission.

8. The method of claim 5, wherein the PUCCH transmission includes at least one of:
a hybrid automatic repeat request,
a link recovery request, or
a scheduling request.

9. The method of claim 8, wherein the SRS transmission is a semi-persistent SRS transmission, a periodic SRS transmission, or an aperiodic SRS transmission.

10. The method of claim 4, wherein performing the action comprises:
refraining from transmitting the second SRS transmission; and
dropping each symbol associated with the second SRS transmission.

11. The method of claim 10, wherein the first SRS transmission uses the second set of antenna ports of the UE, and
wherein performing the action comprises:
transmitting the first SRS transmission.

12. The method of claim 4, wherein performing the action comprises:
identifying a priority level associated with the SRS transmission;
refraining from transmitting the SRS transmission based at least in part on the priority level; and
transmitting the PUSCH transmission.

13. The method of claim 1, wherein the SRS transmission is an aperiodic SRS transmission triggered to be transmitted such that a last symbol of the aperiodic SRS transmission is the last symbol of a first slot,
wherein the PUSCH transmission is scheduled to be transmitted in a next slot after the first slot, and
wherein performing the action comprises:
refraining from transmitting the PUSCH transmission.

14. The method of claim 1, wherein performing the action comprises:
identifying a priority level associated with the SRS transmission;

refraining from transmitting the PUSCH transmission based at least in part on the priority level of the SRS transmission; and
transmitting the SRS transmission.

15. A user equipment (UE) for wireless communication, comprising:
a memory; and
one or more processors, coupled to the memory, configured to:
identify a collision between a physical uplink shared channel (PUSCH) transmission and a guard period of a sounding reference signal (SRS) transmission, wherein the SRS transmission includes a first SRS transmission and a second SRS transmission, the second SRS transmission uses a first set of one or more antenna ports of the UE, and the PUSCH transmission uses a second set of one or more antenna ports of the UE; and
perform an action to mitigate the collision based at least in part on identifying the collision.

16. The UE of claim 15, wherein the PUSCH transmission and the SRS transmission are configured to be transmitted on a same component carrier.

17. The UE of claim 15, wherein the one or more processors are further configured to:
receive a configuration indicating that an SRS usage includes antenna switching.

18. The UE of claim 15, wherein the one or more processors, to perform the action, are configured to:
refrain from transmitting the SRS transmission.

19. The UE of claim 18, wherein the SRS transmission is configured to be transmitted such that a last symbol of the SRS transmission is a last symbol of a first slot, and
wherein the PUSCH transmission is time-division multiplexed with a physical uplink control channel (PUCCH) transmission and is scheduled to be transmitted in a next slot after the first slot.

20. The UE of claim 19, wherein the PUCCH transmission includes at least one of:
a channel state information report,
a layer one (L1) reference signal receive power report, or
an L1 signal-to-interference-plus-noise ratio report.

21. The UE of claim 20, wherein the SRS transmission is a semi-persistent SRS transmission or a periodic SRS transmission.

22. The UE of claim 19, wherein the PUCCH transmission includes at least one of:
a hybrid automatic repeat request,
a link recovery request, or
a scheduling request.

23. The UE of claim 22, wherein the SRS transmission is a semi-persistent SRS transmission, a periodic SRS transmission, or an aperiodic SRS transmission.

24. The UE of claim 18, wherein the one or more processors, to perform the action, are configured to:
refrain from transmitting the second SRS transmission; and
drop each symbol associated with the second SRS transmission.

25. The UE of claim 24, wherein the first SRS transmission uses the second set of antenna ports of the UE, and
wherein the one or more processors, to perform the action, are configured to:
transmit the first SRS transmission.

26. The UE of claim 18, wherein the one or more processors, to perform the action, are configured to:

identify a priority level associated with the SRS transmission;
refrain from transmitting the SRS transmission based at least in part on the priority level; and
transmit the PUSCH transmission.

27. The UE of claim 15, wherein the SRS transmission is an aperiodic SRS transmission triggered to be transmitted such that a last symbol of the aperiodic SRS transmission is the last symbol of a first slot,
wherein the PUSCH transmission is scheduled to be transmitted in a next slot after the first slot, and
wherein the one or more processors, to perform the action, are configured to:
refrain from transmitting the PUSCH transmission.

28. The UE of claim 15, wherein the one or more processors, to perform the action, are configured to:
identify a priority level associated with the SRS transmission;
refrain from transmitting the PUSCH transmission based at least in part on the priority level of the SRS transmission; and
transmit the SRS transmission.

29. A non-transitory computer-readable medium storing a set of instructions for wireless communication, the set of instructions comprising:
one or more instructions that, when executed by one or more processors of a user equipment (UE), cause the UE to:
identify a collision between a physical uplink shared channel (PUSCH) transmission and a guard period of a sounding reference signal (SRS) transmission, wherein the SRS transmission includes a first SRS transmission and a second SRS transmission, the second SRS transmission uses a first set of one or more antenna ports of the UE, and the PUSCH transmission uses a second set of one or more antenna ports of the UE; and
perform an action to mitigate the collision based at least in part on identifying the collision.

30. An apparatus for wireless communication, comprising:
means for identifying a collision between a physical uplink shared channel (PUSCH) transmission and a guard period of a sounding reference signal (SRS) transmission, wherein the SRS transmission includes a first SRS transmission and a second SRS transmission, the second SRS transmission uses a first set of one or more antenna ports of the apparatus, and the PUSCH transmission uses a second set of one or more antenna ports of the apparatus; and
means for performing an action to mitigate the collision based at least in part on identifying the collision.

* * * * *